United States Patent
Kehl (10) Patent No.: US 7,937,403 B2
(45) Date of Patent: May 3, 2011

(54) TIME-BASED ANALYSIS OF RELATED KEYWORD SEARCHING

(75) Inventor: Thomas A. Kehl, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 214 days.

(21) Appl. No.: 11/554,514

(22) Filed: Oct. 30, 2006

(65) Prior Publication Data

US 2008/0104050 A1   May 1, 2008

(51) Int. Cl.
*G06F 7/00* (2006.01)
*G06F 17/30* (2006.01)
*G06F 15/16* (2006.01)

(52) U.S. Cl. .................... 707/767; 707/750
(58) Field of Classification Search .......... 707/750, 707/767
See application file for complete search history.

(56) References Cited

U.S. PATENT DOCUMENTS

| 5,915,001 | A * | 6/1999 | Uppaluru ............ 704/270.1 |
| 6,363,373 | B1 * | 3/2002 | Steinkraus ............ 707/3 |
| 6,470,383 | B1 | 10/2002 | Leshem et al. |
| 6,640,218 | B1 | 10/2003 | Golding et al. |
| 6,664,980 | B2 * | 12/2003 | Bryan et al. ......... 715/738 |
| 7,146,416 | B1 * | 12/2006 | Yoo et al. ............ 709/224 |
| 7,152,059 | B2 * | 12/2006 | Monteverde .......... 707/3 |
| 7,240,049 | B2 | 7/2007 | Kapur |
| 7,546,602 | B2 * | 6/2009 | Hejlsberg et al. ....... 719/313 |
| 2002/0188586 | A1 | 12/2002 | Veale |
| 2003/0009430 | A1 * | 1/2003 | Burkey et al. ........ 707/1 |
| 2003/0014399 | A1 | 1/2003 | Hansen et al. |
| 2003/0055816 | A1 * | 3/2003 | Paine et al. .......... 707/3 |
| 2003/0115191 | A1 * | 6/2003 | Copperman et al. ..... 707/3 |
| 2003/0158855 | A1 * | 8/2003 | Farnham et al. ....... 707/102 |
| 2005/0071741 | A1 | 3/2005 | Acharya et al. |
| 2005/0289168 | A1 * | 12/2005 | Green et al. ......... 707/101 |
| 2006/0122976 | A1 * | 6/2006 | Baluja et al. ......... 707/3 |
| 2006/0195426 | A1 * | 8/2006 | Ishii et al. ........... 707/3 |
| 2007/0005587 | A1 | 1/2007 | Johnson et al. |
| 2008/0104045 | A1 | 5/2008 | Cohen et al. |

FOREIGN PATENT DOCUMENTS

WO   WO 02/19147 A1   3/2002

* cited by examiner

*Primary Examiner* — Greta L Robinson
*Assistant Examiner* — Brian E Weinrich
(74) *Attorney, Agent, or Firm* — Weaver Austin Villeneuve & Sampson LLP (57) ABSTRACT

Disclosed are apparatus and methods for displaying related search terms in a time sequence format. In example embodiments, a user search database, for retaining search terms that were used during specific times, may be available. The user search database may be searched to find which users have searched on a selected anchor term. The frequency of use of such anchor term may then be displayed in a time sequence format, e.g., over a week time period. The users that have used this selected anchor term may have also searched on other search terms, and the search terms that belong to a selected category of interest and were also used by the anchor term users may also be located in the user search database. These search terms from the selected category may also be displayed in a time sequence format, e.g., in the month preceding or proceeding the anchor use display's time period.

24 Claims, 5 Drawing Sheets

*Figure 1*

|  | User ID | Date | Term | Category | Search Results | Selected |
|---|---|---|---|---|---|---|
| 202a | ID_1 | Jan. 2, 2006, 3:03pm | rate | Finance | x | no |
| 202b | ID_1 | Jan. 2, 2006, 3:03pm | rate | Finance | y | no |
| 202c | ID_1 | Jan. 2, 2006, 3:03pm | Company_abc | Technology | z | yes |
| 204a | ID_2 | Jan. 2, 2006, 3:15pm | Company_abc | Technology | 1 | no |
| 204b | ID_2 | Jan. 2, 2006, 3:15pm | Company_abc | Technology | 2 | yes |
| 204c | ID_2 | Jan. 2, 2006, 3:15pm | Company_abc | Technology | 3 | no |
| 206a | ID_1 | Jan. 2, 2006, 3:35pm | Company_X | Finance | A | no |
| 206b | ID_1 | Jan. 2, 2006, 3:35pm | Company_X | Finance | B | no |
| 206c | ID_1 | Jan. 2, 2006, 3:35pm | Company_X | Finance | C | no |
| 206d | ID_1 | Jan. 2, 2006, 3:35pm | Company_X | Finance | D | no |

|  | Terms | Category |
|---|---|---|
| 252a | loan | Finance |
| 252b | rate | Finance |
| 252c | mortgage | Finance |
| 252d | Company X | Finance |
| 252e | Company_abc | Technology |
| 252f | Company_Y | Technology |
| 252g | Company_1 | Travel, Retail |
| 252h | Company_2 | Travel, Retail |

TIME-BASED ANALYSIS OF RELATED KEYWORD SEARCHING

BACKGROUND OF THE INVENTION

The present invention is related to techniques for analyzing keyword searches. It also relates to compiling data related to keyword searches for use by potential purchasers of such keyword searches.

The field of targeting advertising to Internet users is increasingly the subject of interest to advertisement providers or sellers of advertisement space on the Internet. Typically, if the value of a particular advertisement can be clearly expressed to the advertisement purchasers, the more an advertising provider can charge for such advertisement space.

In order to facilitate advertisement valuation, a wide variety of Internet users and their Internet interactions can be presented in various ways. One area of Internet use that may be presented to a potential advertisement purchaser is the keyword searches that are performed by users, e.g., through Yahoo! or Google. Specific keyword searches may be determined to be valuable to certain service/product providers or advertisers, and these advertisers may then purchase specific keywords so that the advertiser's website or advertisement is posted along with the search results that are produced from using such purchased search keywords. For example, an advertiser of financial services may desire to purchase a particular keyword that is related to finance, such as "loans", so that the advertiser's financial services are advertised each time a search is performed for such purchased keyword. Alternatively, the keyword purchaser's business website may be included or placed relatively high in the search results for the purchased keyword.

In sum, it is often beneficial to provide search keyword information to advertisers so as to influence the advertiser's value assessment of the particular keyword. Information on a keyword may serve to enhance such keyword's value and increase its purchase price for a particular category of advertiser. Accordingly, sellers of keywords are continually striving to improve the quality of information that can be presented to give enhanced insight to advertisers.

SUMMARY OF THE INVENTION

Accordingly, apparatus and methods for displaying related search terms in a time sequence format are disclosed. In example embodiments, a user search database, for retaining search terms that were used during specific times, may be available. The user search database may be searched to find which users have searched on a selected anchor term. The frequency of use of such anchor term may then be displayed in a time sequence format, e.g., over a week time period. The users that have used this selected anchor term may have also searched on other search terms, and the search terms that belong to a selected category of interest and were also used by the anchor term users may also be located in the user search database. These search terms from the selected category may also be displayed in a time sequence format, e.g., in the month preceding or proceeding the anchor use display's time period.

These and other features of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
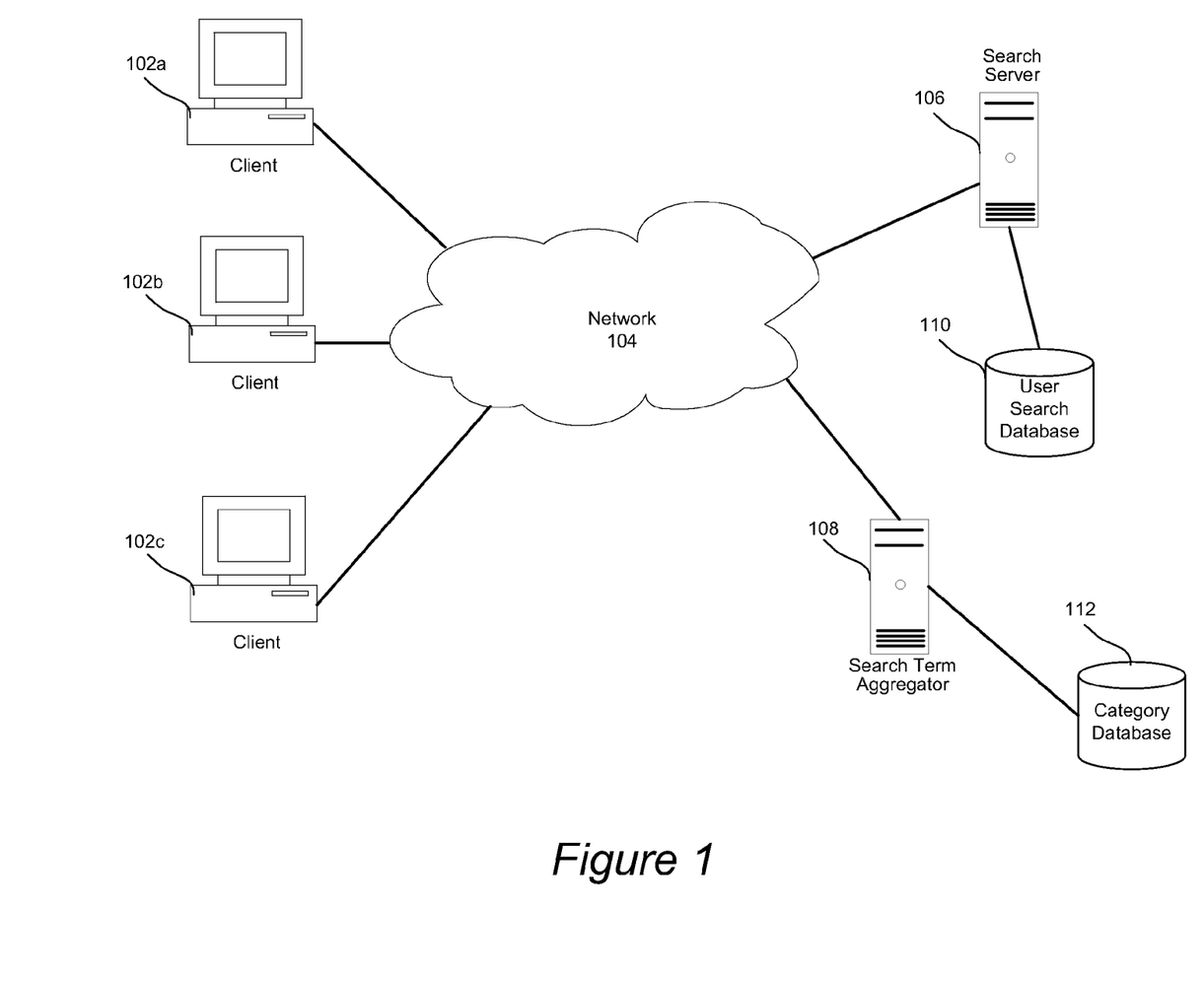
FIG. 1 illustrates an example network segment in which the present invention may be implemented in accordance with one embodiment of the present invention.

FIG. 1 illustrates an example network segment in which the present invention may be implemented in accordance with one embodiment of the present invention. As shown, a plurality of clients 102 may access a search application, for example, on search server 106 via network 104. The network may take any suitable form, such as a wide area network or Internet and/or one or more local area networks (LAN's). The network 104 may include any suitable number and type of devices, e.g., routers and switches, for forwarding search requests from each client to the search application and search results back to the requesting clients.

The search application may take any suitable form. For example, the search application may present a web page having any input feature to the client so the client can enter one or more search term(s). In a specific implementation, the search application includes an input box into which a user may type any number of search terms. Embodiments of the present invention may be employed with respect to any search application, and example search applications include Yahoo! Search, Google, Altavista, Ask Jeeves, etc. The search application may be implemented on any number of servers although only a single search server 106 is illustrated for clarity.

The search server 106 (or servers) may have access to one or more user search database(s) 110 into which search information is retained. Each time a user performs a search on one or more search terms, information regarding such search may be retained in the user search database(s) 110. For instance, the user's search request may contain any number of parameters, such as user or browser identity and the search terms, that may be retained in the user search database(s) 110. Additional information related to the search, such as the current time, are also retained along with the search request parameters. When results are presented to the user based on the entered search terms, parameters from such search results may also be retained. For example, the specific search results, such as the web sites, the order in which the search results are presented, and which search result is selected by the user (if any) may also be retained in the user search database(s) 110.

Figure 2A:
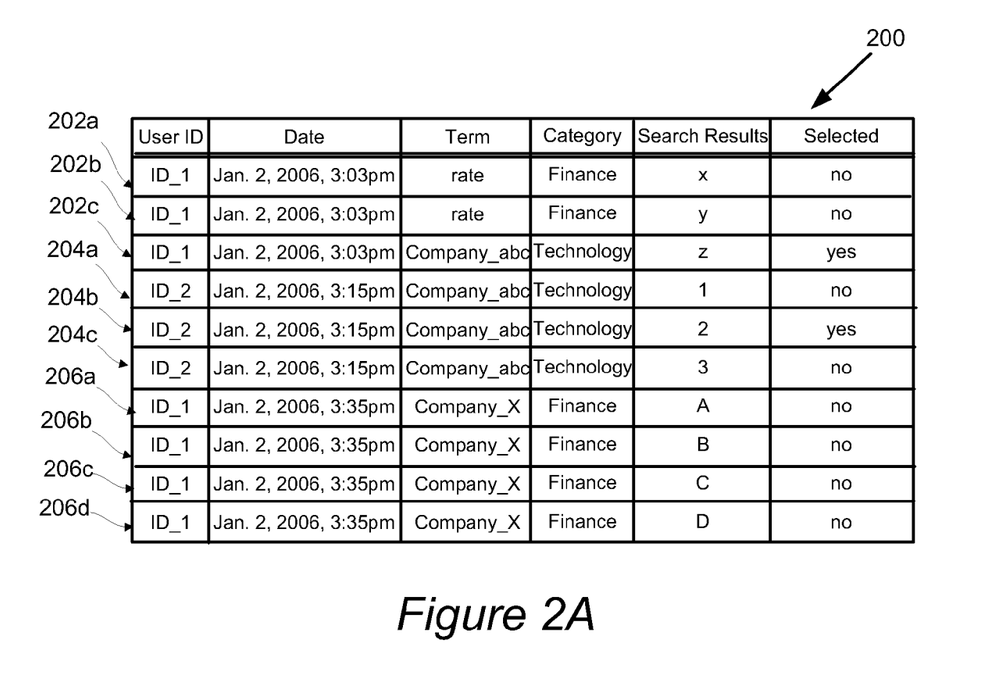
FIG. 2A illustrates an example user search database in accordance with one implementation of the present invention.

The user search database(s) may take any suitable form for retaining useful search information over time. FIG. 2A illustrates an example user search database 200 in accordance with one implementation of the present invention. As shown, the user search database 200 includes a plurality of entries 202*a*~202*c* for a first search by a first user ID_1, entries 204*a*~204*c* for a second search by a second user ID_2, and entries 206*a*~206*d* for a third search by the same first user ID_1. Each entry relates various parameters of a particular user's search for a particular search term and a particular search result. In the illustrated example, each entry includes a user identifier (ID), date, search term, category, search result, and whether such search result was selected by the user. Alternatively, each entry may include a user ID and a plurality of searches that each includes a date, one or more search term(s) and their corresponding categories. The retained information may include other types of data, such as specifying for each search result whether it originates from a sponsored site or from the search algorithm, or the rank of the selected result among all of the search results.

The user ID may correspond to any characteristic associated with the searcher, and the search may be a person or an automated entity. This ID may be associated directly with some form of a user's identity, associated with the browser through which the user is requesting a search, or a search client that is running on the user's device. By way of example, the user ID may be obtained from a browser or user cookie. Alternatively, the user ID may take the form of an identity associated with the device which the user is using for their search. Examples of a device identity include IP (internet protocol) addresses or MAC (media access control) addresses.

The date field may correspond to any suitable time format, and may specify any combination of day, month, year, time, and time zone. The search term corresponds to a search term that was used in a specific search. A specific search may include more than one search term, which may be included in the same or a different entry of the user search database. A category field may be included in the entry to specify in which category the search term of a specific search belongs.

In the present example, a separate entry may be formed for each search term and search result pair. For example, entries 202*a*~*c* each include a user ID equal to "ID_1" and a date "Jan. 2, 2006, 3:03 pm" for a first search. Entries 202*a* and *b* correspond to a search for the search term "rate" in the "finance" category, which produces search results x and y that are also listed in entries 202*a* and 202*b*, respectively. A "no" in the Selected field of entries 202*a* and 202*b* indicate that such search results were not selected by the user. Entry 202*c* corresponds to a search for a search term "Company_abc" in the "Technology" field, resulting in search result "z", which is indicated as selected by the user (e.g., "yes" is indicated in the Selected field)

In certain embodiments of the present invention, a search term aggregator 108 (FIG. 1) operates to handle the search terms and related information retained for searches that are carried out over a period of time, for example, by users of the search application 106. The search aggregator also has access to the user search database(s) 110, as well as one or more category database(s). The category database(s) specify the division of a plurality of search terms among specific search categories. In one implementation, the search categories each relate to a particular product or service category. In one example implementation, the categories include finance, technology and telecommunications, travel, retail, entertainment, automotive, CPG (consumer packaging group), and pharmaceutical.

Figure 2B:
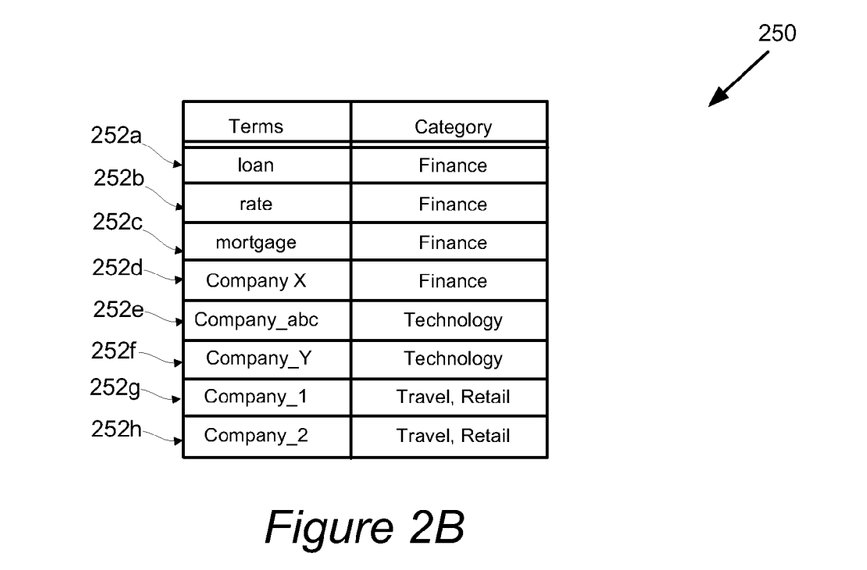
FIG. 2B illustrates a category database in accordance with one embodiment of the present invention.

The category database(s) may take any suitable form for specifying different search categories and their associated search terms. FIG. 2B illustrates a category database 250 in accordance with one embodiment of the present invention. In this example, each entry 252 includes a search term and its corresponding category. For example, entries 252*a*~252*d* for the search terms loan, rate, mortgage, and Company_X each specify the "finance" category for such search terms. Entries 252*e* and 252*f* for search terms Company_abc and Company_Y each specify the category "technology." Entries 252*g* and 252*h* for search terms Company_1 and Company_2 each specify both categories "travel" and "retail." That is, each search term can belong to more than one category. There may also be any number and type of categories.

Figure 3:
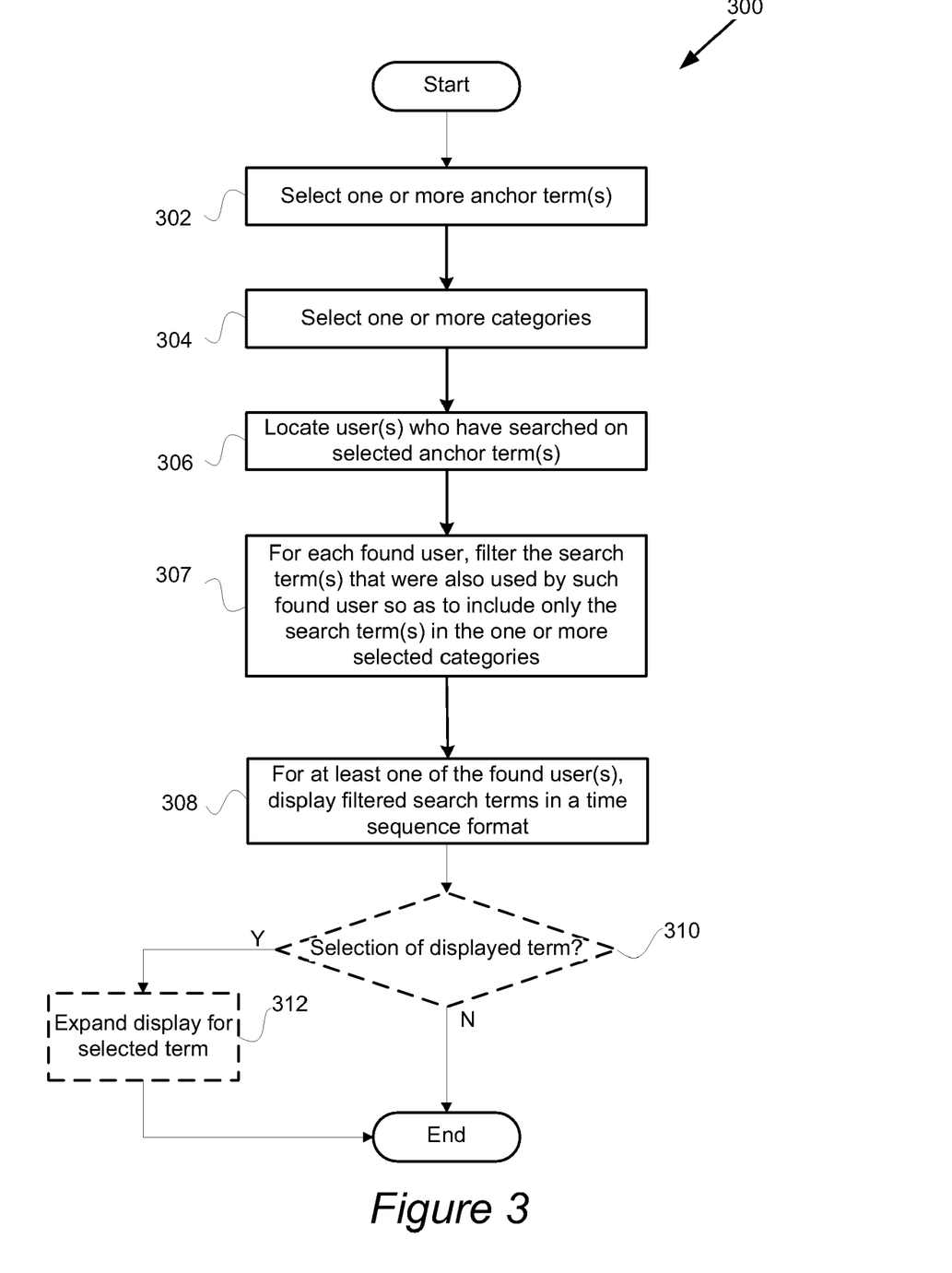
FIG. 3 is a flow chart illustrating a procedure for presenting related search terms in a time sequence format in accordance with one embodiment of the present invention.

Once a user search information has been retained and search terms have been specified for a number of categories, the information may then be presented in a time sequence format. FIG. 3 is a flow chart illustrating a procedure 300 for presenting related search terms in a time sequence format in accordance with one embodiment of the present invention. Initially, one or more anchor terms are selected in operation 302. For instance, a potential search term purchaser selects one or more anchor terms for receipt and analysis by the Search Term Aggregator 108 of FIG. 1. A potential purchaser may select a search term of interest as an anchor term to then find out which other search terms are used by a user in a particular period of time who also searches on the anchor term in the same or a different time frame. The anchor term may be fed into the search aggregator process in any suitable manner, such as an input field in a user interface for the search aggregator process. The anchor terms are preferably handled by an administrator or owner of such search aggregator application.

One or more categories may also be selected in operation 304 in any suitable manner, for example, by a potential search term purchaser and fed into the aggregator by administrator. One or more users who have searched on the selected anchor term(s) are then located in operation 306. For instance, the user search database(s) are searched for occurrences, in a specific time period, of search term(s) equal to the selected anchor term(s). Each user may be a person or an automated entity.

Figure 4:
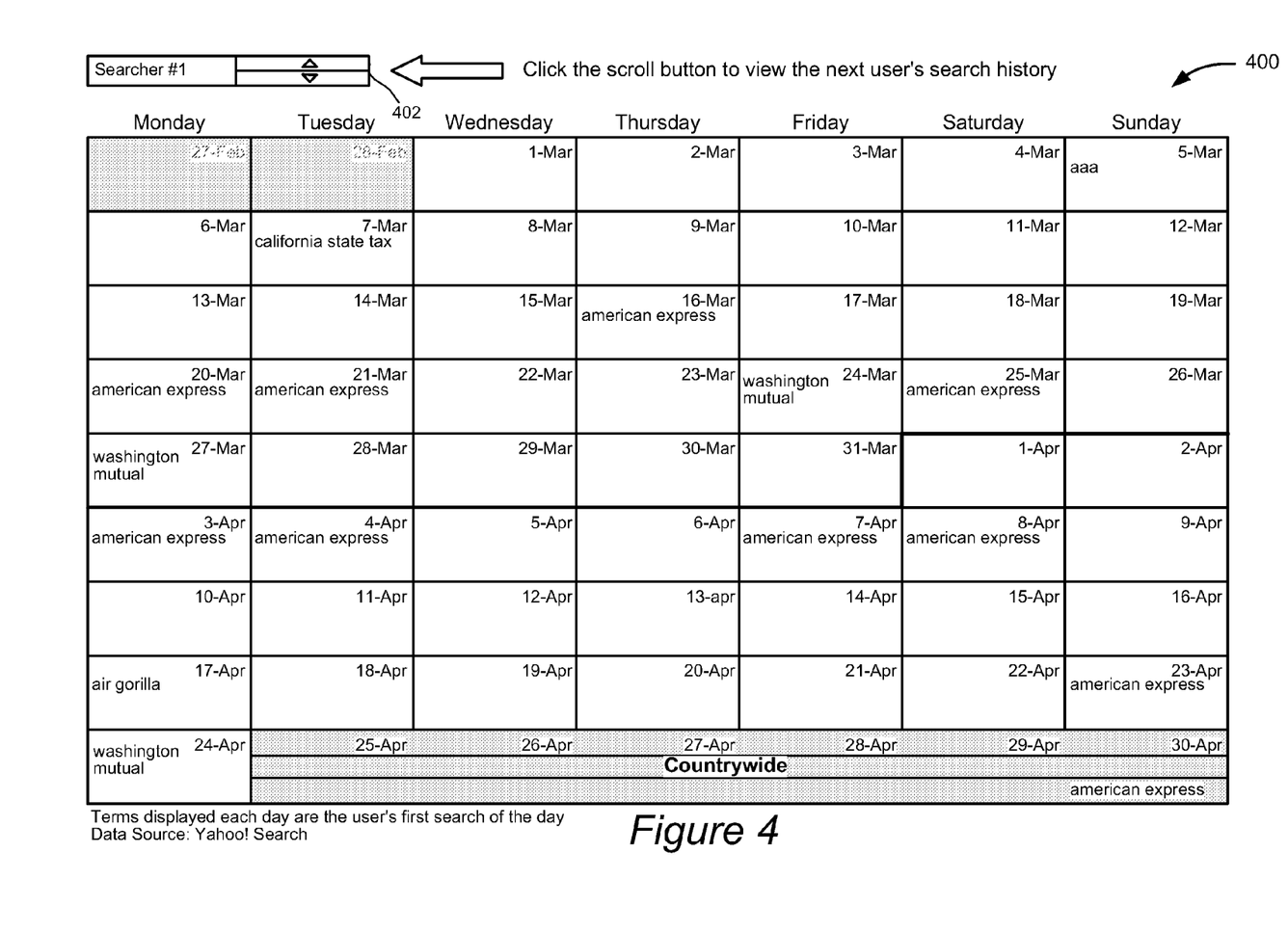
FIG. 4 illustrates a presentation of related search terms in a month format for one or more users in accordance with one application of the present invention.

For each found user, the search term(s) that were also used by such found user are then filtered so as to include only the search term(s) in the one or more selected categories in operation 307. In operation 308, the filtered search term(s) are then displayed for at least one user using a time sequence format. The selected anchor term(s) as used by at least one user may also be displayed in a time sequence format. FIG. 4 illustrates a presentation 400 of related search terms in a month format for one or more users in accordance with one application of the present invention. In this implementation, the related search term(s) (e.g., filtered terms) are displayed individually for each user. The filtered search term(s) used by each user may be sequentially selected and displayed using the input scroll 402. Alternatively, the filtered search terms may be displayed all at once for all users or a subset of users.

In the present example, the anchor term is "Countrywide" and use of such anchor term is displayed for a first user within the specific time period of April $25^{th}$ through April $30^{th}$. The time sequence format for the displaying when the anchor term was used or searched may be any suitable period of time, such as the current day or week or other time period. As shown, the filtered search terms (e.g., "California state tax", "American Express") are also populated in a time sequence format of one month that precedes the time period for displaying use of the anchor term. The time sequence format for displaying the use of the filtered search terms may be the same or a different time frame than the time frame used to display the anchor term use. For example, the time sequence format for the filtered search time may match, proceed, or precede displaying of the anchor term.

A subset of the filtered search terms may only be displayed on a given day. In the present example, the search term in the selected categories that was searched first in each day is only displayed. Referring back to the procedure of FIG. 3, accordingly, it may be determined whether a displayed term (e.g., the single term displayed on a specific day) is selected in operation 310. If a term is selected, the display for such selected term may be expanded in operation 312. Otherwise, this operation 312 is skipped.

Expansion may include displaying a subset or all of the filtered search terms that were searched in the same day for the selected search term. Alternatively, expansion may include showing other relevant search information such as the search results for the selected term, the order of the search result, or the search result that the user selected (if any).

In another embodiment, selection of a displayed search term may trigger another search term aggregation process. For example, the selected search term is defined as a new anchor term and the process of FIG. 3 is repeated for such new anchor term. A new display is then presented based on the new anchor term and filtered search terms from the selected categories. The procedure of FIG. 3 may be repeated for any number of search terms that are selected from iterative displays.

Embodiments of the present invention allow one to view related search terms and their use in a time sequence format. For instance, one or more user's use of an interesting term, e.g., anchor term, may be displayed over a sequential time period such as a week. Additionally, other search terms from selected categories may also be displayed in a time sequence format. This frequency-of-use information may be useful in determining the value of related search terms.

Figure 5:
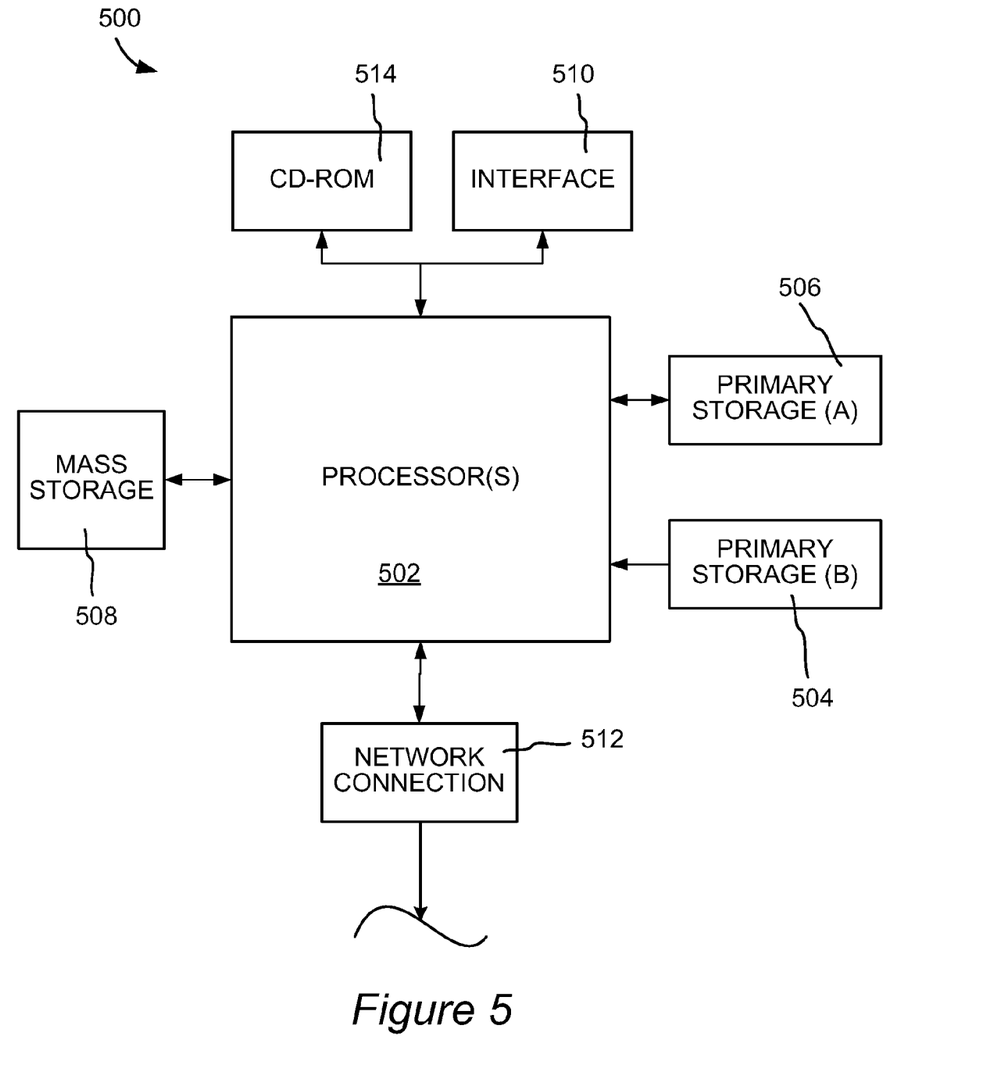
FIG. 5 illustrates an example computer system in which specific embodiments of the present invention may be implemented.

The present invention may be implemented in any suitable combination of hardware and/or software. FIG. 5 illustrates a typical computer system that, when appropriately configured or designed, can serve as a search term aggregator of this invention. The computer system 500 includes any number of processors 502 (also referred to as central processing units, or CPUs) that are coupled to storage devices including primary storage 506 (typically a random access memory, or RAM), primary storage 504 (typically a read only memory, or ROM). CPU 502 may be of various types including microcontrollers and microprocessors such as programmable devices (e.g., CPLDs and FPGAs) and unprogrammable devices such as gate array ASICs or general purpose microprocessors. As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media such as those described above. A mass storage device 508 is also coupled bi-directionally to CPU 502 and provides additional data storage capacity and may include any of the computer-readable media described above. Mass storage device 508 may be used to store programs, data and the like and is typically a secondary storage medium such as a hard disk. It will be appreciated that the information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 is also coupled to an interface 510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to an external device such as a database or a computer or telecommunications network using an external connection as shown generally at 512. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store the category database(s), selected categories, selected anchor terms, the user search database(s), etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:
1. A method, comprising:
   (a) at a search term aggregator server, receiving from a particular user of a client device a query for viewing a plurality of related search terms in a particular category that are used by a plurality of search application users, via one or more search server, who also each used a selected anchor term in the particular category;
   (b) from a plurality of user search databases for storing user search information pertaining to each of a plurality of searches by a user for web documents that are relevant to a corresponding search term, obtaining user search information for each search by each user who also conducted at least one search for documents that are relevant to the selected anchor search term, wherein the user search information for each search includes a user identifier, a time of search, a corresponding search term, and a search term category;

(c) filtering the obtained user search information to include only user search information pertaining to searches for web documents that are relevant to the corresponding search terms in the selected category; and (d) from the filtered user search information, sending to the client device a user interface for selectively displaying the corresponding search terms and the selected anchor search term for each user in a time sequence calendar format that spatially displays when the corresponding search terms and the selected anchor search term were used relative to each other for their corresponding searches in a particular time period and the frequency of use of the corresponding search terms.

2. A method as recited in claim 1, wherein the filtered user search information includes corresponding search terms that at least one user used prior to the selected anchor term.

3. A method as recited in claim 1, wherein the filtered user search information includes corresponding search terms that at least one user used subsequent to the selected anchor term.

4. A method as recited in claim 1, wherein the user interface is configured for selectively displaying the corresponding search terms of the filtered user search information separately for each user.

5. A method as recited in claim 1, wherein the user interface is configured for selectively displaying the corresponding search terms of the filtered user search information for all the users together.

6. A method as recited in claim 1, wherein the user interface is configured for selectively displaying only a portion of the corresponding terms for each user on a particular day, wherein such portion is selectable for further displaying a remaining portion of the corresponding terms for such each user for such particular day.

7. A method as recited in claim 1, further comprising receiving a selection of a particular corresponding search term that was selectively displayed in the user interface to thereby define a new selection of an anchor term and repeating operations (b) through (d) for such new anchor term selection.

8. A method as recited in claim 1, wherein at least one of the users is an automated entity.

9. An apparatus comprising at least a processor and a memory, wherein the processor and/or memory are configured to perform the following operations:

(a) at a search term aggregator server, receiving from a particular user of a client device a query for viewing a plurality of related search terms in a particular category that are used by a plurality of search application users, via one or more search server, who also each used a selected anchor term in the particular category;

(b) from a plurality of user search databases for storing user search information pertaining to each of a plurality of searches by a user for web documents that are relevant to a corresponding search term, obtaining user search information for each search by each user who also conducted at least one search for documents that are relevant to the selected anchor search term, wherein the user search information for each search includes a user identifier, a time of search, a corresponding search term, and a search term category;

(c) filtering the obtained user search information to include only user search information pertaining to searches for web documents that are relevant to the corresponding search terms in the selected category; and (d) from the filtered user search information, sending to the client device a user interface for selectively displaying the corresponding search terms and the selected anchor search term for each user in a time sequence calendar format that spatially displays when the corresponding search terms and the selected anchor search term were used relative to each other for their corresponding searches in a particular time period and the frequency of use of the corresponding search terms.

10. An apparatus as recited in claim 9, wherein the filtered user search information includes corresponding search terms that at least one user used prior to the selected anchor term.

11. An apparatus as recited in claim 9, wherein the filtered user search information includes corresponding search terms that at least one user used subsequent to the selected anchor term.

12. An apparatus as recited in claim 9, wherein the user interface is configured for selectively displaying the corresponding search terms of the filtered user search information separately for each user.

13. An apparatus as recited in claim 9, wherein the user interface is configured for selectively displaying the corresponding search terms of the filtered user search information for all the users together.

14. An apparatus as recited in claim 9, wherein the user interface is configured for selectively displaying only a portion of the corresponding terms for each user on a particular day, wherein such portion is selectable for further displaying a remaining portion of the corresponding terms for such each user for such particular day.

15. An apparatus as recited in claim 9, wherein the processor and/or memory are further configured for receiving a selection of a particular corresponding search term that was selectively displayed in the user interface to thereby define a new selection of an anchor term and repeating operations (b) through (d) for such new anchor term selection.

16. An apparatus as recited in claim 9, wherein at least one of the users is an automated entity.

17. At least one computer readable storage medium having computer program instructions stored thereon, wherein the computer readable storage medium is in the form of magnetic media, optical media, or magneto-optical media, wherein the computer program instructions are arranged to perform the following operations:

(a) at a search term aggregator server, receiving from a particular user of a client device a query for viewing a plurality of related search terms in a particular category that are used by a plurality of search application users, via one or more search server, who also each used a selected anchor term in the particular category;

(b) from a plurality of user search databases for storing user search information pertaining to each of a plurality of searches by a user for web documents that are relevant to a corresponding search term, obtaining user search information for each search by each user who also conducted at least one search for documents that are relevant to the selected anchor search term, wherein the user search information for each search includes a user identifier, a time of search, a corresponding search term, and a search term category;

(c) filtering the obtained user search information to include only user search information pertaining to searches for web documents that are relevant to the corresponding search terms in the selected category; and (d) from the filtered user search information, sending to the client device a user interface for selectively displaying the corresponding search terms and the selected anchor search term for each user in a time sequence calendar format that spatially displays when the corresponding search terms and the selected anchor search term were used relative to each other for their corresponding searches in a particular time period and the frequency of use of the corresponding search terms.

18. An at least one computer readable storage medium as recited in claim 17, wherein the filtered user search information includes corresponding search terms that at least one user used prior to the selected anchor term.

19. An at least one computer readable storage as recited in claim 17, wherein the filtered user search information includes corresponding search terms that at least one user used subsequent to the selected anchor term.

20. An at least one computer readable storage as recited in claim 17, wherein the user interface is configured for selectively displaying the corresponding search terms of the filtered user search information separately for each user.

21. An at least one computer readable storage as recited in claim 17, wherein the user interface is configured for selectively displaying the corresponding search terms of the filtered user search information for all the users together.

22. An at least one computer readable storage as recited in claim 17, wherein the user interface is configured for selectively displaying only a portion of the corresponding terms for each user on a particular day, wherein such portion is selectable for further displaying a remaining portion of the corresponding terms for such each user for such particular day.

23. An at least one computer readable storage as recited in claim 17, wherein the computer program instructions are further arranged for receiving a selection of a particular corresponding search term that was selectively displayed in the user interface to thereby define a new selection of an anchor term and repeating operations (b) through (d) for such new anchor term selection.

24. An at least one computer readable storage as recited in claim 17, wherein at least one of the users is an automated entity.

* * * * *